Oct. 8, 1935.  G. W. SMITH  2,016,824
CONTROL SYSTEM AND RELAY DEVICE THEREFOR
Filed March 28, 1933  4 Sheets-Sheet 1
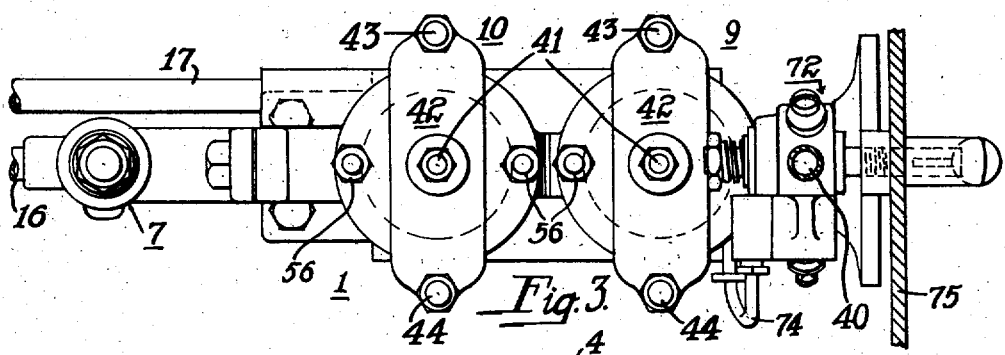
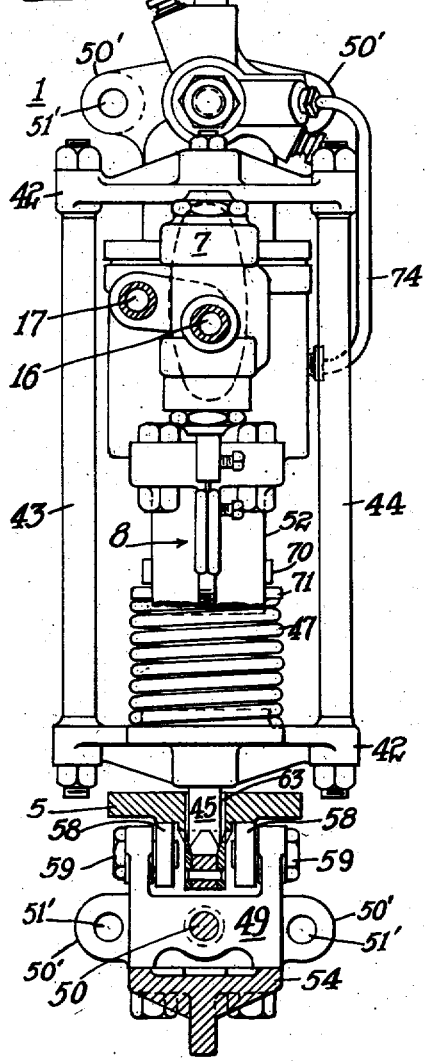
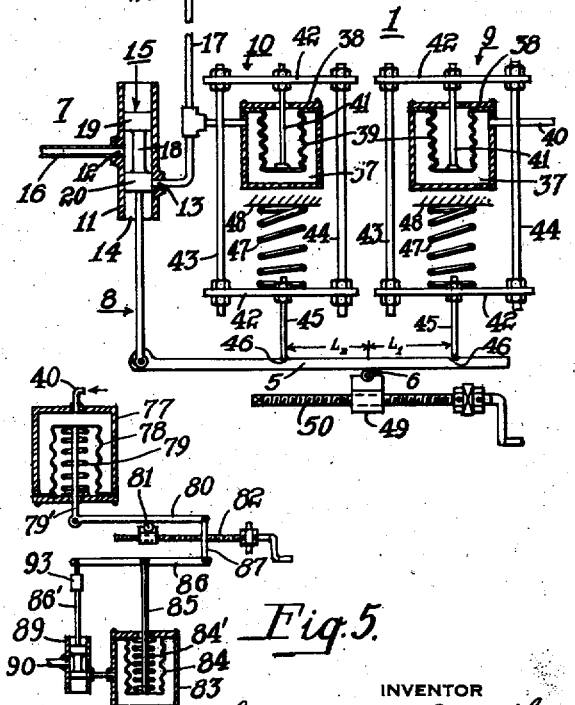
INVENTOR
George W. Smith
By Green & McCallister
His Attorneys

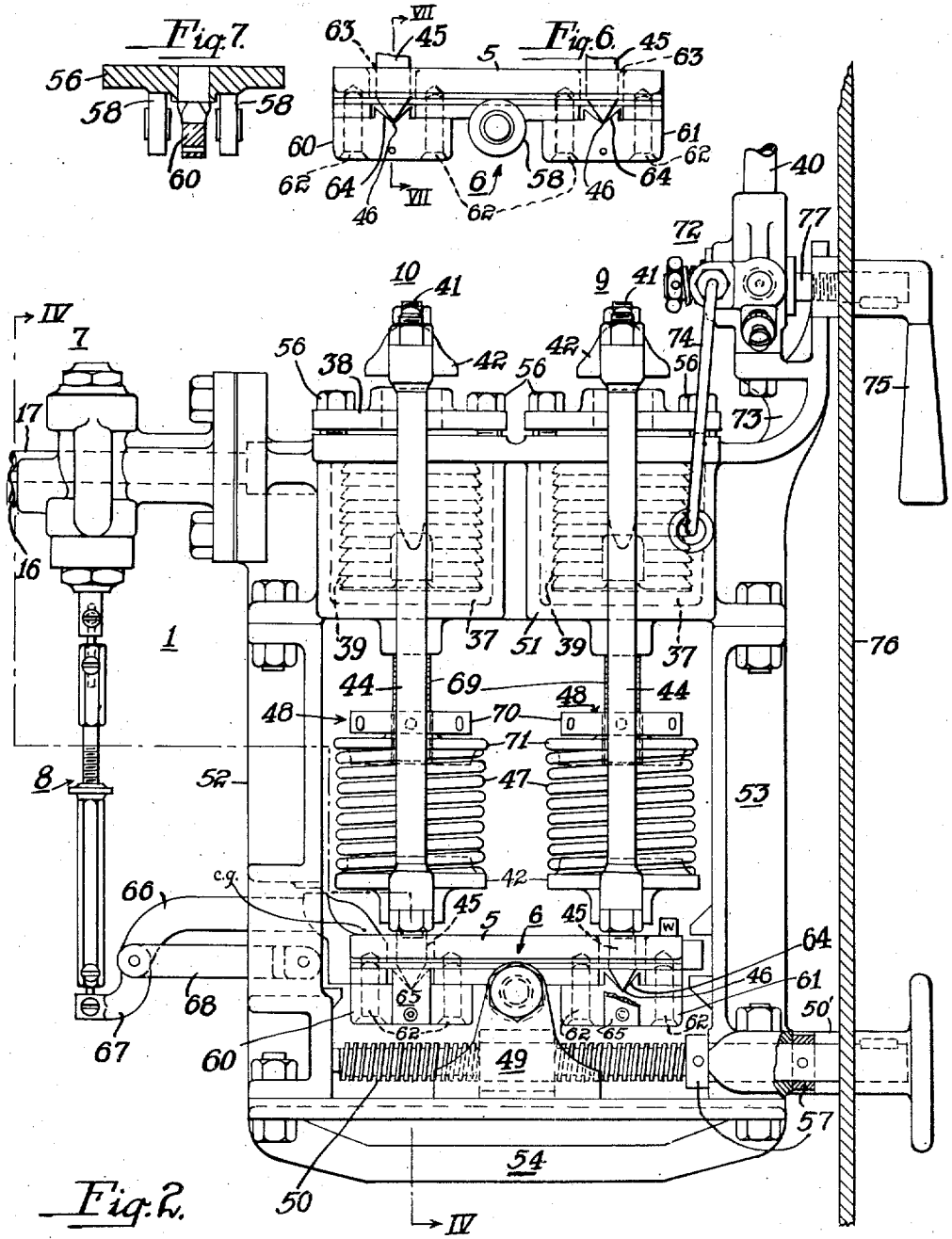

Oct. 8, 1935.   G. W. SMITH   2,016,824
CONTROL SYSTEM AND RELAY DEVICE THEREFOR
Filed March 28, 1933   4 Sheets-Sheet 3
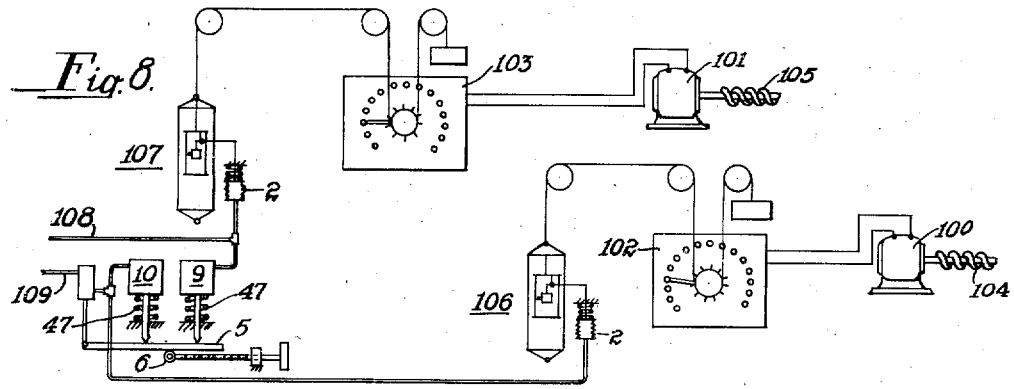
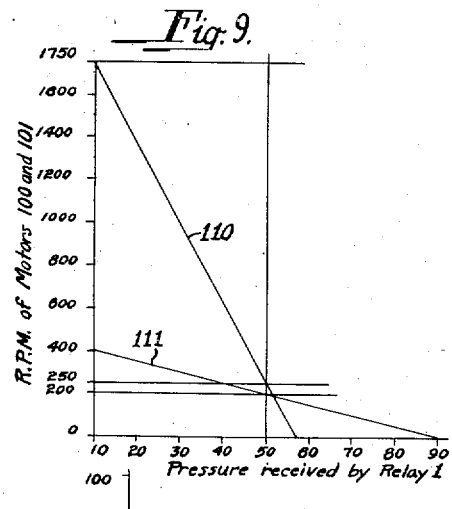
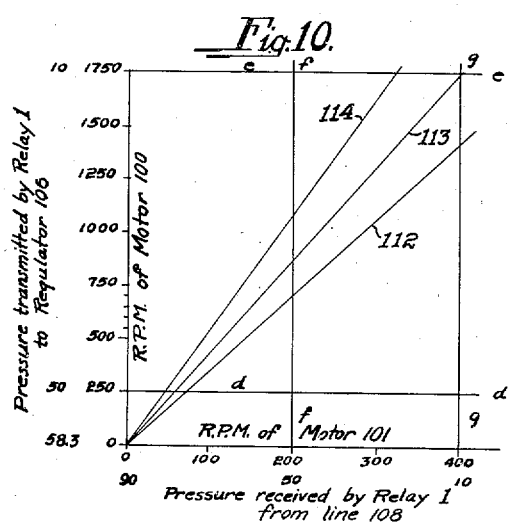
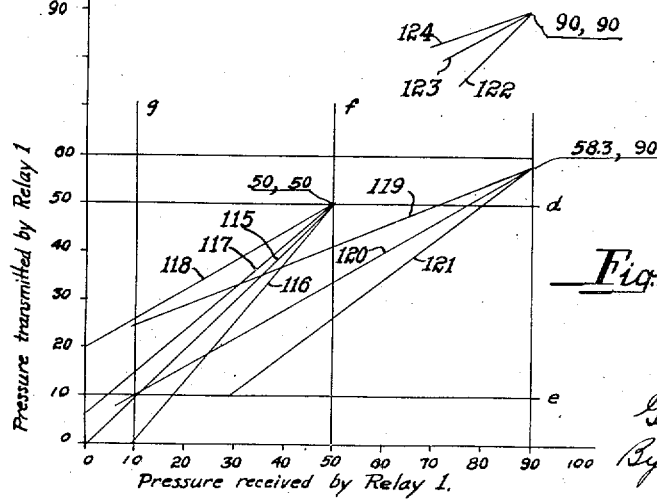
INVENTOR
George W. Smith
By Green & McCallister
His Attorneys Oct. 8, 1935.   G. W. SMITH   2,016,824
CONTROL SYSTEM AND RELAY DEVICE THEREFOR
Filed March 28, 1933   4 Sheets-Sheet 4

INVENTOR
George W. Smith
By Green & McCallister
His Attorneys

Patented Oct. 8, 1935

2,016,824

UNITED STATES PATENT OFFICE 2,016,824

CONTROL SYSTEM AND RELAY DEVICE THEREFOR

George W. Smith, Pittsburgh, Pa., assignor to John M. Hopwood, Dormont, Pa.

Application March 28, 1933, Serial No. 663,145

24 Claims. (Cl. 236—85)

This invention relates to relays and control systems wherein by the use of relays, such as will be described hereinafter the effect of a variable acting at one point in the system, may be relayed or transmitted to another point more or less distant.

An object of this invention is the provision of a control system wherein the effect of a variable operating force developed in one part of the system may be transmitted or relayed to another point in the system, and wherein the effect of the force so relayed may be caused to bear a fixed ratio to the magnitude of the operating force.

Another object of this invention is the provision of a relay device for use in systems, such as referred to above, that shall be simple in construction, efficient in operation and particularly sensitive to small variations in physical forces.

A further object of the invention is the provision of a relay that shall be adapted to transmit or relay the effect or effort of an operating force to a point more or less distant, and whereby the effect or effort so transmitted or relayed may be caused to bear a fixed relation to the intensity or magnitude of the operating force or effort.

An object of this invention is the provision of a control device whereby a variable actuating force may be balanced by another variable force which may be transmitted to a receiving device so that the magnitude of the force transmitted may be caused to bear a predetermined substantially constant ratio to the variable actuating force, and whereby the ratio between said forces may be varied at will.

Another object of the invention is the provision of a control system in which the above objects may be attained and in which the magnitude of the impulse pressure decreases with increasing values of the variables controlled.

A further object of the invention is to provide a pressure relaying device in which, if Y represents the pressure received and B represents a predetermined standard value of that pressure, and if X represents the pressure transmitted by the relay and A a predetermined standard value of that pressure, and if K represents a constant of proportionality, the performance of the relay will be such that for every pressure Y received, a pressure X is transmitted, pressures X and Y always bearing the relationship $A-X=K(B-Y)$.

A further object of the invention is the provision of a relay adapted to function in accordance with the above stated relationship, in which the constant K, and the standards A and B or both may be conveniently adjusted at will.

Relays well known to the art have been employed having a performance characterized by the equation $X=KY$, where K is either adjustable or non-adjustable. U. S. Patent No. 1,549,745 of Church discloses a relay having such a performance characteristic but in which the constant K is non-adjustable.

So far as I am aware, none of the relays of the prior art have a performance characteristic to which the relation $(A-X)=K(B-Y)$ applies, A and B not being equal to zero and K, A, and B being adjustable.

A still further object of the invention is the provision of a relay device that shall be adapted to receive pressure impulses from an actuating device and to relay another pressure impulse to a more or less distant point, and so constructed that the magnitude of the pressure impulse relayed to such point, shall always bear a fixed relation to the magnitude of the impulse received from the actuating device.

And a still further object of the invention is the provision of a relay such as referred to above wherein the relation between the pressure impulses received and relayed may be varied or adjusted at will.

Other objects of the invention will, in part, be obvious and will, in part, be apparent from the following description taken in conjunction with the accompanying drawings in which:

Figure 1 is a diagrammatic illustration of a control system and a relay device arranged and constructed in accordance with one embodiment of the invention;

Fig. 2 is an assembly view, in side elevation, of a relay device, such as shown in Fig. 1, arranged and constructed in accordance with a preferred embodiment of the invention;

Fig. 3 is a top plan view of the relay shown in Fig. 2;

Fig. 4 is a view in front elevation of the relay shown in Figs. 2 and 3, a part thereof being shown in section, said section being taken on line IV—IV of Fig. 2;

Fig. 5 is a diagrammatic illustration of a modified form of relay device, such as may be employed in the system shown in Fig. 1 and which may be substituted for the relay there illustrated;

Fig. 6 is a view in section showing details of construction of a beam embodied in the relay shown in Figs. 2 to 4, inclusive;

Fig. 7 is a sectional view of the beam shown in Fig. 6 taken on line VII—VII of Fig. 6;

Fig. 8 is a more or less diagrammatic view of a system having motors therein of different speed range characteristics, and a relay for maintaining a predetermined relationship or ratio between the speeds of the motors;

Fig. 9 is a graph depicting the relation between the speeds of the motors and control impulses transmitted to the relay above mentioned;

Fig. 10 is a compound graph showing the relation between the speeds of the motors of Fig. 8, and between the magnitude of control impulses delivered to and transmitted by the relay;

Fig. 11 is a graph showing several groups of performance curves of the relay and the range of adjustments that may be made, thus indicating that the relay has capacity for an infinite number of performance characteristics;

Figure 12:
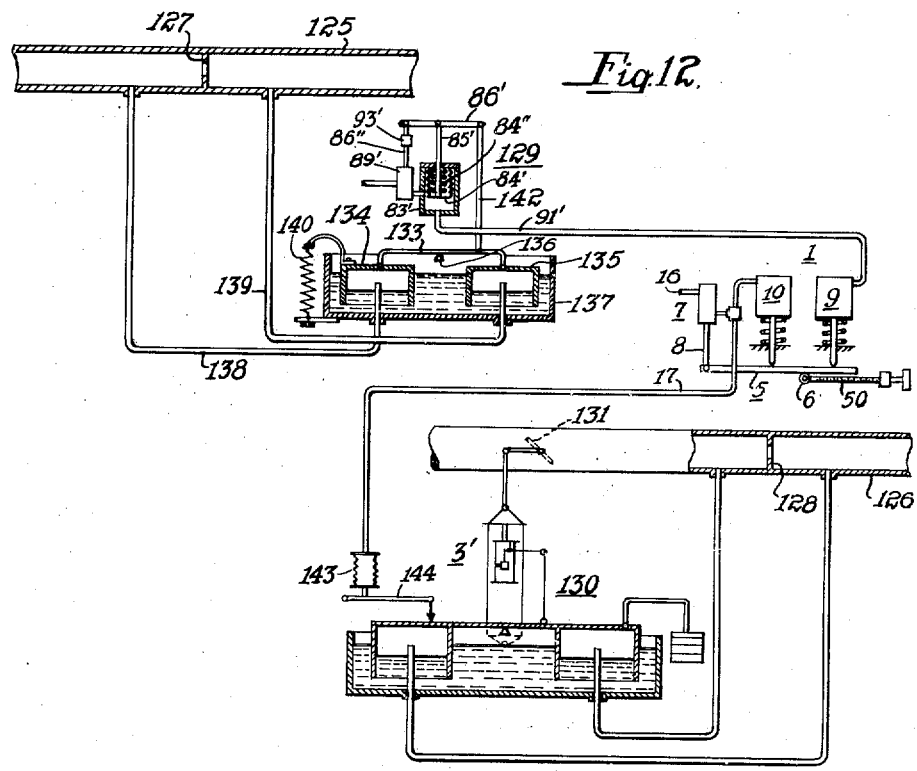
Figure 13:
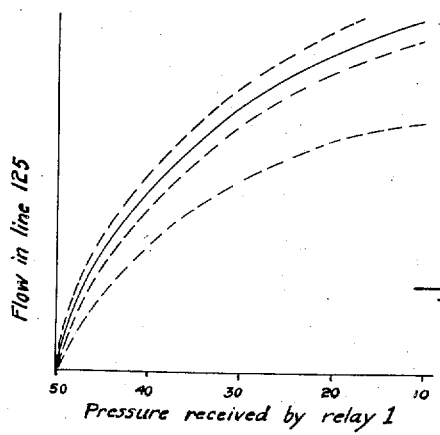

Fig. 12 is a more or less diagrammatic view of a control system in which the relay may be utilized to maintain a predetermined ratio between the rate of flow of gases, fluids or liquids in a plurality of pipe lines; and Fig. 13 is a graph showing the relation between the flow in one of the lines of Fig. 12, and the magnitude of primary control impulses which are developed in the system of Fig. 12 in response to variations in such flow.

Throughout the drawings and the specification like reference characters indicate like parts.

In Fig. 1 of the drawings, a relay device 1, a receiving device 2 and a regulator 3, the operation of which is under the control of the receiving device, are shown. The relay device, it will be understood, when applied to combustion control apparatus, for example, may be caused to operate in accordance with some operating variable, as steam pressure for example. The relay being designed to respond to forces or impulses developed by variations in steam pressure, may, as shown, relay the effect of such variations to the receiving device 2 which may be located at some point more or less distant.

Regulator 3 may be utilized to operate a damper 4 or fuel feeder, and being under the control of receiving device 2, may be caused to regulate either the furnace draft or the rate of fuel delivery, in accordance with variations in steam pressure.

While the control system, as stated, is applicable to boiler furnaces, it is to be understood that the system and the relay device may be put to other uses where the forces or effects developed by a variable operative may be relayed to some point more or less distant to effect the control of some other operative upon which the variations in the first mentioned variable operative depend.

Relay device 1 includes a beam 5 mounted on a fulcrum 6, a valve 7 operatively connected to the beam by a link 8, and control devices 9 and 10 operatively connected to the beam.

The valve 7 comprises a body 11, in which inlet, outlet and exhaust ports 12, 13, and 14 are formed, and a valve plug 15 for selectively controlling communication between the inlet and outlet ports, and outlet and exhaust ports, respectively.

The inlet port is connected to a supply pipe 16 having therein a medium under pressure, the outlet port is connected by a pipe 17 to receiving device 2, and the exhaust port is open to the atmosphere. As shown, the valve plug has an annularly grooved body portion 18 and enlarged end portions 19 and 20 which have a pressure tight fit with the interior bore of the valve body. The upper enlarged end portion of the valve plug is always in such position that the pressure medium in pipe 16 cannot escape through the upper end of the valve body to the atmosphere.

When the valve plug is in neutral position, the lower enlarged end portion covers the outlet port 17 so that the pressure medium from pipe 16 cannot flow through the valve body into pipe 17 and thence to receiving device 2. Also when in neutral position the medium under pressure contained in pipe 17 cannot escape through the exhaust port 14 to the atmosphere.

By lowering the valve plug 15 until the outlet port is uncovered, the pressure medium may flow from the supply line 16 through the valve body and the outlet port into pipe 17 to increase the pressure served to the receiving device 2. When the valve plug is raised until the outlet port is uncovered the pressure medium in pipe 17 may escape through the outlet and exhaust ports to the atmosphere, thereby reducing the pressure in pipe 17 and the receiving device.

By increasing the pressure in pipe 17 and the receiving device 2, regulator 3 is caused to move upwardly in incremental steps in accordance with the incremental increases in pressure within the receiving device. Likewise by reducing the pressure acting on the receiving device 2 in decremental steps, the regulator 3 is caused to move downwardly in incremental steps in accordance with such decremental reductions in pressure.

The construction of regulator 3 is shown and described in John M. Hopwood Patent, No. 1,371,243, dated March 15, 1921. This regulator is also shown and described in detail in George W. Smith, Patent No. 1,931,906, granted Oct. 24, 1933; and assigned to John M. Hopwood.

Briefly, regulator 3 comprises a cylinder 22 in which a piston (not shown) is disposed for reciprocating movement. The piston has a piston rod 23 attached thereto to the upper end of which a crosshead 24 is secured. Side rods 25 depend from the crosshead and, as shown, are parallel to the cylinder. The lower ends of the side rods are connected by a second crosshead 24. A pilot valve 26 is mounted on the cylinder for controlling movements of the piston. The valve is of such construction that, when moved in one direction, pressure is admitted, from a supply pipe 27, to the cylinder at the bottom side of the piston and when moved in the other direction the pressure is admitted to the cylinder at the top side of the piston. When pressure is admitted to the cylinder at the bottom side of the piston, the piston crossheads and side rods move upwardly; and downwardly if pressure is admitted to act on the top side of the piston.

The arrangement of the valve 26 as shown is such that upward movement of the valve stem causes downward movement of the piston rod and side rods and when moved downwardly, upward movement of the elements is effected. The valve is operated by a rocker bar 28 pivotally secured to the cylinder at 29, which rocker bar is attached to the receiving device by means of a link 30. The rocker bar is also connected to the stem of pilot valve 26 by means of a bell crank 31 which is pivotally attached to the rocker bar as at 32.

As shown, the horizontal arm of the bell crank is attached to the valve stem and the vertically extending arm is attached by means of a link 33 to a lever 34 which is pivoted at its lower end on the cylinder. The upper end of lever 34 has a slidable connection with an angling bar 35 which is carried by one of the side rods 25.

Thus if the receiving device 2 moves link 30 upwardly, in response to an increase in pressure, rocker bar 28 is turned counterclockwise, whereby the valve stem is moved downwardly causing the piston in the cylinder to move upwardly. As the piston moves upwardly, the side rods and angling bar move upwardly, causing lever 34 to turn in such a direction that the valve 26 is returned to neutral position. The opposite action takes place when the pressure within the receiving device 2 is reduced.

When the pressure in device 2 is reduced, the pilot valve is shifted in the opposite direction causing the piston and side rods to move downwardly. When they have moved upwardly a predetermined distance, the angling bar 35, acting through lever 34 and link 33, causes the pilot valve to be returned to its neutral position. Thus by means of the levers and linkages disclosed for operating the pilot valve incremental movements of the piston in the cylinder may be obtained in either direction.

Control devices 9 and 10 which are operatively connected to beam 5, are similarly constructed, hence similar and corresponding parts will be designated by the same reference characters.

Control device 9 comprises or includes a pressure receiving chamber 37, having a removable cover 38, within which is disposed a collapsible diaphragm or bellows 39. The open end of the bellows is secured between the cover and the top of the pressure chamber in fluid tight relationship therewith. The pressure chamber has communication with a pipe line 40 through which a variable pressure is transmitted to the pressure chamber, in accordance with some variable operative to be controlled. The pressure impulses delivered to the interior of pressure chamber may be controlled from a master regulator (not shown) in accordance with variations in the operative, as steam pressure, for example. As the pressure acting within the interior of pressure chamber 37 varies, the collapsible diaphragm will expand or contract in accordance with such variations. As illustrated in the drawings, a stem or rod 41 extends through an opening in cover 38 and is secured to the bottom of the collapsible diaphragm or bellows so that as the bellows contracts the stem is raised and as it expands the stem is lowered. The upper end of the stem carries a crosshead 42 from which two side rods 43 and 44 depend. The lower ends of the side rods are connected together by means of a second crosshead 42 to which a stem 45 is attached. The lower end of the stem is provided with a knife edge 46 that bears upon the valve operating beam 5.

As will be apparent from the aforesaid description of the collapsible diaphragm 39 located in the pressure chamber, any pressure acting within the chamber on the collapsible diaphragm or bellows tends to cause upward movement of the side rods 43 and 44 and the associated crossheads.

In order that movements of the collapsible diaphragm may be opposed by a substantially constant predetermined force, a compression spring 47 is interposed between the lower crosshead 42 and an adjustable stop 48. In practice, such a spring is chosen, and such adjustment in the tension thereof is made, that the force exerted by the spring on the lower crosshead is equal to the force exerted by the bellows on the upper crosshead when the interior of pressure chamber 37 is subjected to the maximum operating pressure, or that the force exerted by the spring is equal to the force which would be exerted by the bellows if some selected pressure higher than the maximum operating pressure were admitted to chamber 37.

Since the force of the spring 47 opposes that exerted by the bellows on the upper crosshead, it will be apparent that the resultant force exerted by stem 45 upon valve operating beam 5 will be equal to the difference between the force of the spring acting on the lower crosshead and the force of the bellows or collapsible diaphragm 10 exerted on the upper crosshead. Thus, if a spring is selected that exerts a force of 60 pounds on the lower crosshead and a pressure of 60 pounds is exerted by the bellows on the upper crosshead when the maximum operating pressure is applied to the interior of chamber 37, the resultant force exerted on the beam will be equal to the difference between these forces, which is zero. If the bellows exerts a force of 50 pounds on the upper crosshead it will be apparent that the resultant force acting on the beam will be 10 pounds.

Actuation device 10 may, as shown, be similar to actuating device 9 and differs therefrom in that the pressure acting on the interior of the pressure chamber 37 is received from the pipe 17 connected to the outlet port of valve 7. Thus, as valve plug 15 is shifted to that position in which the pressure in pipe line 17 is is increased, the pressure within pressure chamber 37 of device 10 will also increase. Or, if the valve plug is shifted to that position in which the exhaust port is in communication with the outlet port of the valve, the pressure in pipe 17 and the interior of pressure chamber 37 will be reduced.

As shown, stem 45 of device 10 acting on beam 5, tends to turn the beam in a clockwise direction whereas stem 45 of device 9 acts on the beam at the opposite side of the fulcrum 6 and turns or tends to turn the beam counterclockwise.

If stems 45 of devices 9 and 10 bear on the beam at equal distances from the fulcrum 6 it will be apparent that when the pressure in chamber 37 of device 9 is equal to the pressure in chamber 37 of device 10, beam 5 will be in a state of balance. As shown, the position of the beam 5, when balanced, is substantially horizontal, and the valve plug 15 is in neutral position. When in this position the valve plug covers the outlet port 13 so that the pressure medium in pipe line 17 and in pressure chamber 37 of device 10 will be retained therein.

As shown in Fig. 1, the length of the lever arm at which stem 45 of device 9 acts on valve operating beam 5 is designated by the reference character $L_1$, and the length of the lever arm at which the stem of device 10 acts on the beam is designated by reference character $L_2$. Thus, if the lever arms are of equal length and the tension of the springs 47 in devices 9 and 10 are equal and the area of the collapsible diaphragms in pressure chambers 37 are equal, it will be apparent that valve operating beam 5 will be in equilibrium when the pressures acting on the interior of pressure chambers are equal.

In the case where lever arms $L_1$ and $L_2$ are equal, it will be apparent that beam 5 is rocked either clockwise or counterclockwise in response to changes in pressure in the pressure chamber of device 9. If the pressure decreases therein, beam 5 turns clockwise, moving valve plug 15 upwardly to relieve or reduce the pressure in the pressure chamber of device 10 until it is equal to the pressure in the chamber of device 9. When these pressures are equal the valve operating beam is again returned to its balanced position and the valve plug to its neutral position.

The opposite action takes place when the pressure in chamber 37 of device 9 increases. In such case, valve plug 15 is shifted to that position in which the pressure in chamber 37 of device 10 is equal to the pressure in the chamber of device 9. Thus it will be apparent that the pressure changes in chambers 37 of devices 9 and 10 are always in the same direction.

From the above description it will be apparent that relay device 1 is in effect a balance, in which beam 5 is the balance beam and devices 9 and 10 are variable weights. A change in the force of one weight, which corresponds to device 9 acting on the beam, causes the valve plug 15 to be shifted to that position in which the force of the other weight, corresponding to device 10, acting on the balance beam, is adjusted until it is equal to the force exerted by the other weight (device 9) on the beam. Thus, in effect devices 9 and 10 are variable weights that act on the beam so that any unbalance between the weights results in the operation of the valve to effect a rebalancing of these weights on the balance beam.

In the case where the lever arms $L_1$ and $L_2$ are of equal lengths, the pressures delivered to receiving device 2 will always be equal to the pressures delivered to the pressure chamber of device 10 of the relay. However, in some cases, it may be desirable that a higher pressure be delivered to receiving device 2 than that which is delivered to the pressure chamber of device 9. In other cases it may be desirable that the pressure delivered to receiving device 2 and to the interior of the pressure chamber of device 10 be less than the pressures delivered to the pressure chamber of device 9. In either case, whether the pressures be higher or lower than those delivered to the pressure chamber of device 9, the pressures delivered to the receiving device 2 should bear a fixed relation to the pressures delivered to the pressure chamber of device 9.

In order that the pressures delivered to the receiving device 2 may be either higher or lower than the pressures delivered to the pressure chamber of device 9 and still bear a fixed relation to the pressures so delivered, fulcrum 6 is mounted on a movable block or support 49 so that the fulcrum may be moved longitudinally of beam 5. The means employed for shifting the position of fulcrum 6 and the block which supports it, may be in the form of a screw 50, such as shown, that may be turned either by means of a handwheel or a crank.

A preferred form of construction of relay device 1 is illustrated in Figs. 2, 3, and 4 of the drawings. Since the essential elements of relay device 1 have been described in connection with Fig. 1, those elements will be designated by the same reference characters throughout Figs. 2, 3, and 4. As shown more particularly in Figs. 2 and 3, pressure chambers 37 of devices 9 and 10 are formed in the single or unitary casting 51. The casting 51 is mounted on the upper ends of uprights 52 and 53, the lower ends of which are secured to a stationary beam 54. The beam 54, uprights 52 and 53 and casting 51 may be appropriately secured together by means of bolts or other suitable means as shown. The bellows or collapsible diaphragms 39 in the pressure chambers 37 are indicated in broken lines in Fig. 2.

As shown in Figs. 2 and 3 each pressure chamber which is formed in the casting 51 is provided with a removable cover 38, for securing the edges at the open end of each bellows in fluid or pressure tight relationship with the upper or open end of the pressure chambers. As shown, these covers are secured to the casting by means of screws 56.

The upper and lower crossheads 42 to which the side rods 43 and 44 are attached are relatively rigid and strong (see Fig. 4) so as not to deflect in operation.

Valve 7 is attached to the casting 51, as shown in Fig. 2, by means of screws, the casting and the valve being suitably ported as indicated in Fig. 4 to provide for communication between the pressure supply line 16 and the interior of pressure chamber 37 of device 10 and the pressure receiving device 2 shown in Fig. 1. In the construction shown in Figs. 2, 3, and 4, the pressure communicated or delivered to the receiving device 2 flows from the pressure supply line 16 through the valve, into the pressure chamber of device 10, and thence from the pressure chamber into pipe 17 which is connected to receiving device 2 as shown in Fig. 1.

As shown more particularly in Fig. 2, the screw 50 which is utilized for shifting block 49, is journalled in the uprights 52 and 53 near to their lower ends. The screw is held against longitudinal movement by means of collars 57 which are secured to the shaft on each side of the lower end of upright 53 by pins or other suitable means. Block 49 which travels back and forth on screw 50, slides along the upper face of the beam 54. The upper end of the block 49 is of U-shape, on each side of which fulcrum rollers 58 are mounted by means of screws or stub shafts 59. Beam 5, as shown more particularly in Fig. 4, remains stationary while resting on the fulcrum rollers 58 as the block which carries these rollers is shifted longitudinally along the adjusting screw 50.

As shown in Fig. 2, beam 5 is provided with blocks 60 and 61 at each end thereof, being secured to the underside of the beam by means of screws 62. The shape of the beam 5 and the block 49 are illustrated more in detail in Figs. 4 and 6 of the drawings. As illustrated, the beam is of T-shape, the underside of which is provided with flanges or trackways extending longitudinally of the T on each side of the T-leg on which the beam moves over the fulcrum rollers. The blocks 60 and 61, as shown, are of somewhat inverted T-shape with the leg of the T projecting upwardly into apertures 63 formed in beam 5 through which stems 45 of devices 9 and 10 pass. The upper ends of the legs of the T's of these blocks are each formed with a V-shaped groove 64 for accommodating the knife edges 46 formed at the ends of stems 45.

In order to prevent lateral or sidewise movement of the beam so that the knife edges will not shift out of position, guide pieces 65 are secured to blocks 60 and 61 at opposite sides thereof so as to cover the ends of the V-slots or grooves 64, as is apparent from Figs. 2 and 4 of the drawings, and hold the stems 45 and beam 5 in alinement.

As shown more particularly in Fig. 2, beam 5 is formed with an extension 66 which is connected by a curved link 67 to link 8 which operates the valve plug of valve 7. As shown, link 8 is adjustable in length so that the proper travel of the valve plug 15 may be coordinated with the swing of beam 5. To prevent longitudinal movement of beam 5, a link 68 is pivotally connected to the free end of extension 66 and to the upright 52.

To provide for adjusting the tension in springs 47 associated with weighing devices 9 and 10, a screw 69 is attached to casting 51 at the bottom of each pressure chamber as shown in Fig. 2. Each screw is provided with an adjustable nut 70 which bears downwardly against a seat 71 accommodating the upper end of its associated spring. Thus by turning the nuts either up or down the proper tension may be set up in springs 47. Nuts 70 and seats 71 constitute the adjustable stops 48 referred to in the description of Fig. 1.

The variable pressure which is communicated to the interior of pressure chamber 37 of device 39 flows from pipe line 40 to a valve 72 mounted on an upwardly extending bracket 73 formed integrally with the pressure chamber casting 51, and thence through a pipe 74 through the port formed in a wall of the pressure chamber as shown. Valve 72 may be operated by a hand lever 75, as shown, either to automatic position, that is to such position that any variation in pressure in pipe line 40 will be directly communicated to the pressure chamber 37 of device 9, or to a manual control position. In manual control position, valve 72 blanks off line 40 and through ports in the plug of valve 72, opens chamber 37 and pipe 74 to atmosphere. The spring 47 of device 9 then exerts its full force unbalanced by any pressure in 37 on the beam 5. By moving the fulcrum 6 from mid position towards the right, the counterbalancing force necessary on the part of device 10 may be varied from one equal to the force exerted by 9 to any desired fraction thereof, and hence the pressure in chamber 37 of device 10 which opposes spring 47 of device 10 may be varied by such motion. This constitutes a manual control of the pressure in line 17 and of any regulators taking their impulse therefrom.

The relay device may be bolted on a panelboard 76 as indicated, by means of ears 50' (Fig. 4) having holes 51' therein.

It will be apparent by inspection that when relay 1 is mounted for operation in an upright position, and as shown in Fig. 2, the weight of valve plug operating link 8, and the valve operating beam 5 is so distributed that the center of gravity thereof is at some point to the left of the fulcrum rollers 58, as the point designated C. G. therefore, it will be apparent that the center of gravity of the beam and the linkages connected thereto will tend to cause the beam to turn in a counterclockwise direction. In other words, because the center of the gravity of the beam and the linkages do not coincide with the point of contact with the fulcrum rollers and the beam, the beam will always be more or less unbalanced depending upon the distance between the point of contact of the fulcrum rollers with the beam and the center of gravity, and the effect of this unbalance upon the pressure set up in chamber 37 of device 10 will depend upon the position of fulcrum 6.

In order to overcome this condition of unbalance caused by the off-center relationship of the center of gravity and the point of contact between the fulcrum rollers and the valve operating beam, a weight W is mounted on the beam to the right of the fulcrum rollers as indicated in Fig. 2. The mass of weight W is preferably equal to the weight of the beam and the linkages connected thereto acting at the center of gravity C. G.

Weight W is placed at the same distance to the right of the fulcrum point as the center of gravity is to the left thereof. Thus, if the fulcrum rollers are shifted to the left, as viewed from Fig. 2, a distance of one inch for example, then the weight W must be shifted to the left a distance of two inches in order that the moment of weight W about the fulcrum point will exactly balance the moment of the center of gravity of the beam and the linkages connected thereto, about the fulcrum point. In other words the weight W is shifted, either to the left or the right, a distance approximately equal to twice the distance which the fulcrum point is shifted with respect to the center of gravity for any particular adjustment. While the weight as illustrated is manually adjustable, it will be apparent that appropriate means may be provided for shifting this weight in the proper direction automatically in response to movements of the block 49 on which the fulcrum rollers are mounted.

By mounting relay 11 in an inverted position, i. e., upside down with reference to the position illustrated in Fig. 2, and so constructing beam 5, member 66, and link 68 that the center of gravity of these elements coincides with knife edge 46 acting at the left hand end of beam 5, the relay beam and linkage will always be in balance regardless of the position of fulcrum 6. Therefore, when mounting the relay upside down, weight W may be omitted because it is not then necessary to shift the center of gravity of the above-mentioned elements when the fulcrum is shifted. The weight of beam 5 and its associated moving members 66, and 8, and a portion of the weight of link 68 is thereby supported at all times by knife-edge 46 of device 10, and regardless of the position of fulcrum 6, the force of this weight is neutralized by adjusting spring-nut 70 to compress spring 47, in addition to its usual compression, the amount necessary to support the weight of the described parts.

A modified form of relay is illustrated in Fig. 5. The relay illustrated in Fig. 5 comprises a pressure chamber 77 in which a collapsible diaphragm or bellows 78 is disposed. The bellows operates against a compression spring 79 disposed interiorly thereof as shown. Pressure is communicated to the interior of chamber 77 by means of a pipe such as pipe 40 of Fig. 1. A push rod or stem 79' is disposed interiorly of bellows 78 and spring 79. The lower end of stem 79' is connected to a beam 80 mounted on a fulcrum 81. The fulcrum may be moved longitudinally of the beam by means of a screw 82 which is arranged for manual adjustment, such as the fulcrum and the screw arrangement shown in connection with the relay device illustrated in Figs. 2, 3, and 4.

The relay illustrated in Fig. 5 also includes a pressure chamber 83 in which a bellows or collapsible diaphragm 84 is disposed. The bellows or diaphragm operates against a compression spring 84' disposed interiorly thereof, the spring and bellows being constructed similarly to the spring and bellows mounted in the pressure chamber 77 aforementioned. A push rod 85 is disposed concentrically within the spring and the bellows of chamber 83 and is arranged for movement in accordance with the expansion or contraction of the bellows. The upper end of the push rod is connected to a floating lever 86 at an appropriate point between the ends thereof. One end of lever 86 is connected by a heavy link 87 to one end of beam 80. Thus as beam 80 is rocked on its fulcrum by action of the bellows or collapsible diaphragm in pressure chamber 77, lever 86 is rocked in the same direction by means of link 87. The other end of lever 86 is connected by a link 86' to the valve plug of a valve 89 such as described in connection with the relay device shown in Fig. 1.

The inlet port of valve 89 is connected to a pressure supply line 90, such as the supply line 16 of Fig. 1. The outlet port of the valve is connected to the interior of pressure chamber 83 and to the interior of a pipe line 91 such as feeds the receiving device 2 of Fig. 1.

In operation, if the fulcrum 81 is disposed at the center point of beam 80, and springs 79 and 84 of the relay adjusted for equal spring tension, it is apparent that beam 80 will be in a state of balance, valve 89 will be in its neutral position, and equal pressures will be applied to the interior of chambers 77 and 83. If the pressure is increasing in pressure chamber 77, it follows that the pressure in chamber 83 must also increase in order to maintain the valve in its neutral position and beam 80 in its balanced position, as in the case of the relay shown in Fig. 2.

The operation of the device shown in Fig. 5 is as follows: If the pressure in pressure chamber 77 increases, the bellows therein is compressed and beam 80 and lever 86 are turned counterclockwise, whereby the valve plug of the valve is moved downwardly so that the pressure in pressure chamber 83 is increased. Such increase in pressure immediately causes the bellows to contract, move the push rod upwardly and return the valve to its neutral position, thereby shutting off further increase of pressure in chamber 83.

If the pressure in chamber 77 is decreased the opposite action takes place in that the valve plug is moved upwardly to that position in which pressure is permitted to escape from pressure chamber 83 and reduce the pressure therein. Such reduction in pressure causes the bellows to expand, whereby the push rod is moved downwardly and the valve stem returned to neutral position.

By adjusting the position of the adjustable fulcrum 81, the movement required of the bellows in pressure chamber 83 to return the valve plug to neutral position for any given movement of the bellows in pressure chamber 77 may be made to be any percentage more or less of the movement of the bellows in pressure chamber 77.

In a system where a decrease in the pressure delivered or sent to pressure chamber 77 causes an increase in the operating rating of a boiler or other apparatus controlled thereby, as in the case where the rating of a boiler is increased to take care of increased load demands, the length of link 86' connected to the stem of valve 89 is adjusted at 93 so that when pressure chamber 77 is receiving the highest pressure impulse corresponding to zero load rating, chamber 83 will be subjected to a pressure of equal value. Thus equal pressures in pressure chamber 77 will produce equal pressure changes in pressure chamber 83, and each departure of pressure in chamber 83 from the highest pressure impulse will bear a fixed ratio to the departure of pressure from the highest pressure taking place within pressure chamber 77, which ratio is determined by the position of the adjustable fulcrum 81.

In making the adjustment referred to above in the relay device shown in Fig. 5, beam 80 will be substantially parallel to the longitudinal axis of the screw on which the adjustable fulcrum is supported, when the bellows in pressure chambers 77 and 83 are subjected to the highest pressure, which pressure in a system such as referred to above, corresponds to zero rating.

The relays herein disclosed are so constructed and arranged that a pressure impulse received from some variable operative may be relayed to some distant point more or less remote, and the effects of such variable may be either increased with respect to the variable operative causing the relay to function, or it may be decreased, or the effect so relayed or transmitted may be equal to the intensity of the impulse received. Also by causing one of the pressure weighing devices such as disclosed in Fig. 2 to actuate a valve so as to admit pressure to another weighing device which is arranged to balance the force exerted by the other or first-mentioned weighing device, a wide range in the ratios between the forces from the variable operatives employed to initiate operation of the relay device of the system may be obtained. The force or effect so relayed or transmitted to some point more or less distant may be utilized to control mechanism or apparatus affecting some condition of operation upon which the first-mentioned variable operative depends.

In remote control systems, relay 1 may be utilized to fix or maintain a predetermined relationship between control impulses delivered to regulators that govern the operation of certain devices so that these devices will perform in a predetermined relationship to each other.

Relay 1 may be utilized in various types of systems, of which Figs. 8 and 12 may be taken as illustrating typical systems wherein the relay will function to maintain a predetermined relationship between the performance of devices and apparatus embodied therein.

In Fig. 8, two adjustable speed motors 100 and 101 controlled by rheostats 102 and 103, respectively, are shown, one of which may operate a coal feeder, the other a fan, or both may be operating conveyors or metering devices for dispensing materials. For convenience of explanation, it may be assumed that these motors drive conveyors 104 and 105, and that such conveyors dispense or deliver either the same kind or different kinds of material to a furnace or other apparatus, and further that it may be desirable that the conveyors be operated in such a manner that the amount or rate at which material is delivered by one will bear a definite relation or proportion to the amount or rate at which material is delivered by the other.

Let it also be assumed that the motor 100 is designed to operate over a speed range varying between X and Y R. P. M., say 250 R. P. M. and 1750 R. P. M., and that motor 101 is designed to operate over a speed range varying between X' and Y' R. P. M., say 200 R. P. M. and 400 R. P. M. If it is necessary for the efficient operation of the system that a predetermined ratio be maintained between the speed of operation of the conveyors, and hence the speed of operation of the motors, throughout the entire speed range of both, relay 1 may be adjusted to obtain such performance.

In order to obtain such performance of the motors and the conveyors operated thereby, relay 1 is so adjusted that both motors will operate either at their maximum or minimum speeds when the control impulses governing their operation is either at a minimum or a maximum value. When this adjustment has been made, the speed of the motors will bear a fixed relation to each other throughout the entire range of the control impulses.

The system herein shown is so arranged that when the maximum control impulses occur, the motors will operate at their minimum speeds and at their maximum speeds when the control impulses are at a minimum value. In other words, in the system shown, the speed of the motors is an inverse function of the magnitude of the control impulses.

The rheostats 102 and 103 may be operated by means of regulators 106 and 107, respectively. These regulators are illustrated as being the same in function and structure as regulator 3 of Fig. 1. Since this regulator has been fully described in connection with Fig. 1, similar and corresponding parts of regulators 106 and 107 will be given the same reference characters. It is to be noted that the regulators of Fig. 8 are illustrated more diagrammatically than the regulator 3 of Fig. 2, but it is to be understood that the complete embodiment of these regulators would be the same as the embodiment shown in Fig. 1.

It is to be understood that the changes in speed of motors 100 and 101 are proportional to the changes in impulse pressure received by devices 2 of regulators 106 and 107. If such linear proportionality does not exist in an actual installation, it may be brought about either by suitably arranging the resistances in field rheostats 102 and 103 or by suitably deforming bar 35 of the regulator as shown in Figure 1. When this has been done, not only will minimum impulse pressure correspond to maximum motor speed, and vice versa, but between these limits the motor speed will be varied linearly and inversely with the impulse pressure after the manner shown in Fig. 9 and to be described below.

In the system of Fig. 8, the main control impulse is delivered by means of a master regulator not shown or other suitable device to an impulse line 108 and thence to the bellows 2 of regulator 107 and to the bellows 39 in device 9 of relay 1. Bellows 39 in device 10 of the relay controls the magnitude of the impulse delivered from a pressure line 109 to the bellows 2 of regulator 106. Relay 1 functions to maintain a predetermined relation between the impulses delivered to the bellows of these regulators as has previously been described in connection with this relay.

Let it be assumed that regulators 106 and 107 are normally constructed so as to make a full stroke when the pressure admitted to devices 2 varies from 10 pounds to 50 pounds per square inch. When the pressure transmitted to regulator 10 varies from 10 pounds to 50 pounds per square inch and it takes a full stroke, the speed of motor 101 will vary from 400 to 200 R. P. M. Similarly the speed of motor 100 will vary from 1750 to 250 R. P. M. when the pressure transmitted to it varies from 10 pounds to 50 pounds per square inch.

Then, in order to vary the speed of motor 101 from 400 to zero R. P. M. (assuming for the moment that the stroke of regulator 106 and the range of rheostat 102 could be sufficiently and proportionately extended) the impulses delivered to bellows 2 of the regulator 107 would have to be varied from 10 pounds per square inch to 90 pounds per square inch, and to vary the speed of motor 100 from 1750 R. P. M. to zero, the pressure impulse delivered to bellows 2 of regulator 106 would have to be varied from 10 pounds per square inch to 58.3 pounds per square inch. If curves be plotted, as in Fig. 9, with the speed of the motors as ordinates and pressure impulses as delivered to line 108 as abscissæ, it will be apparent that in order for both motors thus to reach zero speed, simultaneously, the relay would have to transmit a pressure of 58.3 pounds per square inch when receiving one of 90 pounds per square inch. This can be accomplished by giving bellows 39 of devices 9 and 10 of relay 1 initial loadings by springs 47 of ninety and 58.3 pounds, respectively. Then when such pressure should be received as to cause motor 101 to operate at zero speed, the relay will transmit a pressure causing motor 100 to operate at zero speed, and this will be true regardless of the position of fulcrum 6. In this figure, curves 110 and 111 represent the performance of motors 100 and 101, respectively.

As shown in Fig. 9, when the impulse pressure received by devices 2 is 10 pounds per square inch motors 100 and 101 operate at maximum speed and that when this impulse pressure reaches a value of 50 pounds per square inch, these motors operate at their minimum speeds, as curves 110 and 111 indicate.

The speed of these motors will not actually decrease below 250 and 200 R. P. M., respectively, in the system, since these speeds are fixed by the rheostats 102 and 103, but theoretically, zero speed of motors 100 and 101 would occur when the pressure impulse in bellows 39 of device 9 and bellows 2 of regulator 107 reached 90 pounds per square inch at which time the pressure impulse delivered to bellows 2 of regulator 106 would be 58.3 pounds per square inch, and these impulses would then balance the initial loading of the springs thereon.

In Fig. 10, curves 112, 113, and 114 show the relation between the impulse pressure delivered to bellows 39 in device 9 of the relay by line 108 and the pressure sent out from this relay to regulator 106. Since the relation of pressure received to the pressure transmitted by this relay is by adjustment as shown in Fig. 9, the same as the relation of the speed of motors 100 and 101, curves 112, 113, and 114 show both these relations of performance.

If it is desirable that different ratios be obtained between the speeds of motors 100 and 101 such may be had by merely shifting fulcrum 6 to the proper position. The various ratios of performance between these motors that may thus be had, are represented graphically by curves 112, 113, and 114 of Fig. 10.

In Fig. 10, the speed range of motor 100 and the range of impulse pressures delivered by relay 1 to bellows 2 of regulator 106 constitute the ordinates of these curves, and speed range of motor 101 and the range of impulse pressures delivered by line 108 to relay 1 and bellows 2 of regulator 107 constitute the abscissæ thereof. For a given position of fulcrum 6, and while the speed of motor 101 varies from 200 to 400 R. P. M. in response to the impulse pressure in line 108 varying between 50 and 10 pounds per square inch, the speed of motor 100 will vary between a minimum and maximum value proportional to 200 and 400 R. P. M.

Thus curve 112 shows the speed of motor 101 as varying between 200 and 400 R. P. M. and that of motor 100 varying between about 700 and 1400 R. P. M. Curve 113 shows the same speed range for motor 101 but that the speed range of motor 100 is between about 875 R. P. M. and 1750; while curve 114 shows motor 100 having a speed range of from about 1100 R. P. M. to full speed of 1750 R. P. M., while the speed of motor 101 varies from 200 to about 327.

Because, as stated above, the minimum and maximum speeds of motor 101 are fixed by the rheostat 103, the range of control of motors 100 and 101 will be confined to the rectangle bounded by lines d—d, e—e, f—f, and g—g.

These curves are merely illustrative of the precise operation of which relay 1 is capable, its flexibility and easy adjustment, and the manner in which it may be utilized to so coordinate the functions of apparatus as to maintain a substantially fixed, but adjustable, ratio of performance therebetween.

The curves in Fig. 11 depict a plurality of performance characteristics of relay 1. The abscissæ of these curves represent the pressure in pounds per square inch or unit of area received by bellows 39 of device 9 of the relay, and the ordinates represent the pressure in pounds per each square inch or unit of area delivered or transmitted by the relay from the connection between valve 7 and bellows 39 of device 10 of the relay.

Let it be assumed that the area of each bellows of devices 9 and 10 of the relay is one square inch and that each of the bellows is given initial spring loading of 50 pounds, and that fulcrum 6 is adjusted to the center of beam 5, that is, midway between knife edges 45. Under these conditions, there will be no forces exerted on the beam, so that the beam is balanced; but when pressure is admitted to the bellows 39 of device 9 the beam will rock causing pressure of equal intensity to be admitted to the bellows of device 10, thereby balancing beam 5. Thus, the actual force exerted on beam 5 on each side of the fulcrum will be the amount by which the pressures in the bellows is less than the spring loading of fifty pounds.

Therefore, under these assumptions, curve 115 shows the relationship between the pressure received by the relay and the pressure transmitted thereby and that these pressures are equal. Thus, if the pressure impulse received by bellows 39 of device 9 is 20 pounds per square inch, then a force of 30 pounds is exerted on beam 5 and valve 7 will be operated until a force of 30 pounds is exerted on the other end of the beam which occurs when the bellows of device 10 of the relay is subjected to a pressure of 20 pounds per square inch. This is also the pressure of the fluid sent out by the relay. Thus, it is apparent that equal pressures are received and transmitted by the relay.

Curves 116, 117, and 118 show the relation between the pressures received to the pressure delivered or transmitted by relay 1 as the result of shifting or adjusting the fulcrum 6 to one side or the other of the center of beam 5, the initial spring loading on the bellows thereof being unchanged.

If instead of imposing an initial spring loading of 50 pounds on the bellows of relay 1, one of these bellows is spring loaded to the extent of 90 pounds, and the other to the extent of 58.3 pounds, curves 119, 120, and 121 of Fig. 11 show the performance of the relay for three different positions of fulcrum 6. These curves are substantially the same in character as the performance curves which result when the bellows are loaded with 50 pounds spring pressure, the difference being that the relay will operate over a higher range of pressure, that is, the relay is capable of receiving pressures varying from zero to 90 pounds per square inch and of transmitting pressures varying from zero to 58.3 pounds per square inch or vice versa. These performance curves apply to the setting of the relay when embodied in the system of Fig. 8 wherein it is desired to maintain a predetermined relationship between the speeds of motors 100 and 101 and the conveyors operated thereby.

Curves 122, 123, and 124 of Fig. 11 show the performance of the relay when both bellows thereof are given a spring loading to the extent of 90 pounds. Thus, if 90 pounds per square inch of pressure is received by the bellows of device 9 of the relay, a pressure of 90 pounds may be transmitted thereby or if zero pressure is received and fulcrum 6 is midway of the beam, the transmitted pressure would be zero. Curve 122 which, if extended, would intersect the coordinate origin, shows this relation. By shifting fulcrum 6, the relay may be caused to perform as indicated by curves 123 and 124.

It will be seen from these curves that if A represents the pressure equivalent to the initial of spring 47 of device 10, if X represents the pressure transmitted by the relay and communicated to chamber 37 of device 10, and if B and Y similarly represent, respectively, the spring force and pressure received by device 9, then the function of the relay is to transmit automatically such a force X that the relation $A-X=k(B-Y)$ is maintained. $k$ is a proportionality constant. Adjustment of spring 47 of device 9 is equivalent to changing the value of A in the above equation. Adjustment of spring 47 of device 10 is equivalent to changing the value of B. Adjustment of the position of roller 6 by screw 50 is equivalent to changing the value of $k$.

In Fig. 12, a system is illustrated in which relay 1 may be utilized to maintain a predetermined relation or ratio between the flow, in separate pipe lines 125 and 126, of gases, fluids, or liquids. Let it be assumed that in this system, pipe 125 carries blast furnace gas and that pipe 126 carries natural gas and that it is desired to mix these gases in predetermined proportions for combustion in a furnace or other device. If orifices 127 and 128 are placed in these pipe lines there will be a drop in pressure across each orifice that varies with the flow through the same.

The variation in pressure drop across orifice 127 may be utilized to operate a float actuated sending device 129 adapted to transmit pressure impulses, the magnitude of which decreases as the flow through line 125 increases, or vice versa, to the receiving bellows in device 9 of a relay 1 the relay in turn sending or transmitting a pressure impulse to a regulator 130 arranged to operate a damper 131 disposed in line 126. This damper regulates the flow through orifice 128 and hence the pressure drop across the same. Regulator 130 is responsive to this pressure drop, but since its operation is augmented by and in accordance with the pressure impulses transmitted thereto by relay 1, the pressure drop across orifice 128 may be caused to vary with and to bear a predetermined relation or ratio to the pressure drop across orifice 127 in pipe 125. By maintaining a predetermined relationship or ratio between the pressure drops across orifices 127 and 128, it follows that a similar ratio or relationship between the flows of the gas, fluid, or liquid in these lines will be maintained.

The curves of Fig. 13, represent the performance of relay 1 over a predetermined ratioing range, say 50 pounds per square inch to 10 pounds per square inch. The ordinates of these curves represent gas flow in line 125 and the abscissæ represent the pressure impulses that relay 1 may transmit to regulator 130 as the flow in pipe line 125 varies. By suitably adjusting relay 1, it is apparent that numerous ratios may be maintained between the flows in lines 125 and 126, and that as the rate of flow therein increases, the pressure impulses sent out by the relay decrease. These decreasing impulses cause regulator 130 to increase the flow in line 126 by adjusting the damper therein by an amount sufficient to produce a proportionate increase of flow in line 126. The converse is true if the flow in line 125 decreases. If the flow in line 125 remains constant, but the flow in line 126 varies, regulator 130 independently of the augmenting pressure impulses delivered thereto by relay 1 will adjust damper 131 so as to maintain a substantially constant pressure drop across orifice 128. But if the pressure drop across orifice 127 in the line 125 varies, relay 1 will adjust the setting of regulator 130 and produce a corresponding change in the flow in line 126.

The regulator illustrated in Fig. 12, that operates sending device 129 comprises a beam 133 having inverted floats 134 and 135 secured to the ends thereof, the beam being mounted on the fulcrum 136. The floats are partially submerged in liquid, such as oil or water contained in a vessel or tank 137. The interior of float 134 is connected by means of a pipe 138 to the interior of pipe 125 at the upstream side or orifice 127 and the interior of float 135 communicates, by means of a pipe 139 with the interior of pipe 125 at the downstream side of the orifice. Thus beam 133 will rock in accordance with the pressure drop across the orifice.

In order that the beam may be in a balanced position for a given pressure drop across the orifice, the upstream end of the beam may be loaded by means of a tension spring 140. If the pressure drop departs from this value for which the beam is balanced, the beam will rock in one direction or the other depending upon the change in the pressures at the upstream and downstream sides of orifice 127.

Movements of beam 133 caused by variations in the pressure drop across the orifice 127 are utilized to operate a pressure sending device that delivers pressure to the bellows of device 9 of relay 1.

Sending device 129 is similar in construction and operation to a portion of the relay illustrated in Fig. 5 of the drawings. Hence, similar and corresponding parts will be designated by the same reference characters primed. It will be apparent by comparison of Figs. 5 and 12 that the difference between sending device 129 and the relay in Fig. 5 is essentially this—the floating lever 86' instead of being connected to beam 80 as in Fig. 5, is connected by a link 142 to beam 133 of the float regulator.

As the pressure drop across, and hence the flow through orifice 127 decreases, the magnitude of the pressure impulses delivered by sending device 129 to the bellows in device 9 of relay 1 increases and decreases as the pressure drop across the orifice increases.

These variations in the magnitude of the pressure impulses delivered by the sending device to the incoming or receiving side of relay 1, cause the relay to transmit corresponding impulses from the connection between the bellows device 10 of this relay and valve 7 to a bellows 143 associated with regulator 130. This bellows operates a lever 144 which bears on float beam of regulator 130 causing the loading of the downstream end of the beam to vary with variations in pressure drop across the orifice in pipe line 125. Float regulator 130 controls the operation of a motor device 3' of the same construction and operation as regulator 3 of Fig. 1. As the frame of this regulator moves up or down, in response to rocking of the float beam, damper 131 in the pipe line 126 will be shifted to vary the flow through the orifice 127 so as to maintain a predetermined relation between the flow in this line and the flow in line 125.

Float regulator 130 is similar to float regulator which operated sending device 129 and operates in substantially the same manner. The chief difference between these regulators is that in regulator 130 the upstream float is loaded by means of a counterweight 145 whereas in the other the upstream float is loaded with the tension spring 140. The bellows 143 which receives its operating pressure from relay 1 varies the loading on the downstream float of this regulator. Thus as the difference between the loadings imposed by bellows 143 and weight 145 vary in response to operation of relay 10, as effected by variations of pressure drop across orifice 127, motor device 3' will operate to make the necessary adjustment of damper 131.

While several systems have been shown in which relay 1 may be utilized and while two forms of the relay have been shown and described, it is to be understood that various modifications and changes may be made in the relays, as such, and in the systems in which they may be utilized, without departing either from the spirit or the scope of the invention. It is desired therefore that only such limitations, shall be placed on the invention as are imposed by the prior art and the appended claims.

What I claim as new and desire to secure by Letters Patent is:

1. A proportioning relay comprising a lever and a fulcrum therefor, a valve controlled by said lever, a pressure weighing device including a pressure sensitive member and a yielding member connected to oppose each other and acting on said lever at one side of said fulcrum, and disposed to receive fluid, the pressure of which may vary, a second pressure weighing device including a pressure sensitive member and a yielding member connected to oppose each other and disposed to act on said lever at the other side of said fulcrum in opposition to the force exerted thereon by said first pressure weighing device, said second mentioned device having a pressure connection with said valve so that as said lever rocks in response to variations in pressure, the valve will either increase or decrease the pressure acting on said second weighing device to a value such as will place said lever in equilibrium.

2. A proportioning relay comprising a lever having a fulcrum, pressure responsive actuating devices each including a pressure responsive element and a spring differentially connected to each other and acting on said lever on opposite sides of the fulcrum in opposition to each other, the pressure responsive element of one of said devices being disposed to receive a variable actuating pressure, a source of pressure supply associated with the pressure responsive element of the other of said devices, and means controlled by said lever for increasing or decreasing the pressure in said last mentioned device until the forces exerted by said devices on said lever are in equilibrium.

3. A relay device comprising a lever having a fulcrum, springs connected to said lever on each side of the fulcrum and acting in opposition to each other, a pressure responsive device associated with each spring and connected to the lever so as to oppose the forces exerted by the springs on the lever, one of said pressure responsive devices being arranged for connection to a source of primary pressure impulses and to cause said lever to tilt in one direction or the other, and a valve connected to the other of said pressure responsive devices and operated by said lever for controlling the delivery of secondary pressure impulses thereto and to a sending line, said valve operating either to increase or decrease said secondary impulses in accordance with the direction of tilt of said lever to maintain said lever in balanced position.

4. A relay device comprising a lever having a fulcrum, springs connected to said lever on each side of the fulcrum and acting in opposition to each other, a pressure responsive device associated with each spring and connected to the lever so as to oppose the forces exerted by the springs on the lever, one of said pressure responsive devices being arranged for connection to a source of primary pressure impulses and to cause said lever to tilt in one direction or the other, a valve connected to the other of said pressure responsive devices and operated by said lever for controlling the delivery of secondary pressure impulses thereto and to a sending line, said valve operating either to increase or decrease said secondary impulses in accordance with the direction of tilt of said lever to maintain said lever in balanced position, and means for adjusting said fulcrum longitudinally of the lever.

5. A relay device comprising a lever mounted on a fulcrum, a valve connected to the lever and adapted to control a source of fluid pressure, pressure weighing devices connected to said lever in opposition to each other, each of said devices including a pressure sensitive member and a yielding member connected to oppose each other, one of said devices being adapted to weigh a variable pressure, and the other of said devices being connected to said valve, said valve operating to increase or decrease the pressure acting on the device connected thereto so that for each value of variable pressure the forces exerted by one of said devices on said lever is balanced by the force exerted by the other of said devices on said lever, and means for shifting the fulcrum along said lever to change the operating characteristic of said device.

6. A relay comprising a lever mounted on a fulcrum, an actuating device including a pressure responsive element and a yieldable member disposed in opposed relation to each other and acting on said lever at one side of and at the same distance from the fulcrum tending to turn the lever in one direction, a balancing device including a pressure responsive element and a yieldable member disposed in opposed relation to each other and both acting on said lever at the same distance from the fulcrum and tending to turn the same in the opposite direction, a control device, operatively connected to said lever, arranged to solely control the pressures transmitted to the pressure responsive element of the balancing device so that the force exerted thereby on said lever will balance the force exerted thereon by the actuating device.

7. The combination with a fulcrum, a beam mounted thereon, and a valve adapted to control the flow of fluid under pressure from a pressure source to devices to be controlled thereby, said valve also when in one position causing the escape of fluid from said devices to reduce the pressure therein, of a pressure responsive actuating device including a pressure responsive element and a yieldable member disposed in opposed relation to each other and acting on the lever at one side of the fulcrum and at the same distance therefrom and arranged to exert a turning force on said beam in accordance with changes in a variable to be controlled, thereby to actuate said valve to one of its operative positions, and a pressure responsive balancing device including a pressure responsive element and a yieldable member disposed in opposed relation to each other and acting on the lever at one side of the fulcrum and at the same distance therefrom and arranged to exert a turning force in the opposite direction on said beam, said balancing device having a pressure connection to said valve so as to be responsive to the pressures transmitted by said valve to the devices to be controlled.

8. The combination with a lever mounted on a fulcrum, a source of supply of fluid under pressure, and a valve connected to said lever to control said supply source, said valve having neutral, pressure increase and decrease positions, of means for yieldingly urging said lever to balanced position, thereby urging said valve towards neutral position, a pressure responsive device adapted to exert a turning force on said lever to actuate said valve out of neutral to one or the other of said positions, and a pressure responsive balancing device acting on said lever and connected to said valve, said balancing device being disposed to restore said lever to a state of balance, and to return said valve to neutral position.

9. The combination with a balanced lever and a valve operated thereby, said valve being disposed to transmit either increasing or decreasing pressures to an actuating device, of a pressure responsive actuating device including a pressure responsive element and a yieldable member disposed in opposed relation to each other and acting on the lever at one side of the fulcrum and at the same distance therefrom and adapted to exert a turning force on said lever thereby to actuate said valve and vary the pressure delivered to said actuating device, a pressure actuated balancing device including a pressure responsive element and a yieldable member disposed in opposed relation to each other and acting on the lever at one side of the fulcrum and at the same distance therefrom and arranged to exert a turning force on said lever in opposition to that exerted by said pressure responsive device, and a pressure connection between said actuating device and said balancing device, whereby when the turning moments exerted by said devices on said lever are in balance, said valve is actuated to a position in which the pressure to said actuating device is shut off.

10. The combination with a lever having a fulcrum, a source of pressure supply and a valve connected to said lever for controlling said source, said valve having neutral and pressure varying positions, of means yieldingly urging said lever to balanced position, a pressure responsive device acting on said lever to unbalance the same in accordance with a variable to be controlled, a pressure actuated balancing device disposed to exert a turning force on said lever in opposition to that exerted by said responsive device, and a pressure connection between said valve and balancing device, whereby as said valve is actuated by the pressure responsive device, the pressure is varied in the balancing device until said lever has returned said valve to neutral position.

11. A control device having impulse receiving weighing mechanism, impulse sending weighing mechanism, each weighing mechanism including a pressure sensitive member and a yielding member connected in opposition to each other, means affected by both mechanisms adapted to maintain a substantially constant ratio between the magnitude of the impulses received and sent, and means for adjusting said mechanisms to vary the range of impulses through which said control device may operate.

12. A control device having impulse receiving weighing mechanism, impulse sending weighing mechanism, each weighing mechanism including a pressure sensitive member and a yielding member connected in opposition to each other, means affected by both mechanisms for maintaining a substantially constant ratio between the magnitude of the impulses received and sent, and means for adjusting at least one of said impulse mechanisms to vary the ratio between the magnitude of the impulses received by and sent from said devices.

13. A control relay having impulse receiving weighing mechanism adapted to exert a variable force, impulse sending weighing mechanism adapted to exert an adjustable force, each weighing mechanism including a pressure sensitive member and a yielding member connected in opposition to each other, and means affected by the forces exerted by both mechanisms for automatically adjusting the force exerted by the sending mechanism so that a substantially non-varying predetermined ratio is automatically maintained between the forces exerted by said mechanisms.

14. In combination, a source of supply fluid under pressure, means to vary said pressure in accordance with a condition to be controlled, a plurality of mechanisms adapted to affect the condition to be controlled, one of said mechanisms being under the control of said fluid under pressure, another source of supply of fluid under pressure, means responsive to said variable fluid pressure for delivering pressure impulses to another of said mechanisms, and means controlled conjointly by the mechanisms acted on by said variable pressure medium and said impulses for causing the magnitude of said pressure impulses to bear a stable linear relation to the magnitude of said variable pressure medium.

15. A relay having a member adapted to respond to a variable control force (X) and means for opposing said variable force (X) with a predetermined constant force (A), a second member adapted to respond to a control force (Y), and means for opposing said force (Y), with a predetermined constant force (B), means responsive to both forces (X and Y) for so varying one of them that the relation of $$\frac{(A-X)}{(B-Y)}$$

is equal to $(k)$ where $k$ is a constant factor of proportionality, and means for adjusting the relation of force (X) to force (Y).

16. A relay having a member adapted to respond to a variable control force (X) and means for opposing said variable force (X) with a predetermined standard force (A), a second member adapted to respond to a control force (Y), and means for opposing said force (Y), with a predetermined standard force (B), means responsive to both forces (X and Y) for so varying one of them that the relation of $$\frac{(A-X)}{(B-Y)}$$

is equal to $(k)$ where $k$ is a constant factor of proportionality, and means for varying the value of $(k)$ independently of forces (X) and (Y).

17. A relay having a member adapted to respond to a variable control force (X) and means for opposing said variable force (X) with a predetermined standard force (A), a second member adapted to respond to a control force (Y), and means for opposing said force (Y) with a predetermined standard force (B), means responsive to both forces (X and Y) for so varying one of them that the relation of $$\frac{(A-X)}{(B-Y)}$$

is equal to $(k)$ where $k$ is a constant factor of proportionality, and means for manually adjusting either or both of said standard forces A and B.

18. A relay having a member adapted to respond to a variable control force (X) and means for opposing said variable force (X) with a predetermined standard force (A), a second member adapted to respond to a control force (Y), and means for opposing said force (Y) with a predetermined standard force (B), means responsive to both forces (X and Y) for so varying one of them that the relation of $$\frac{(A-X)}{(B-Y)}$$

is equal to $(k)$ where $k$ is a constant factor of proportionality, and means for manually controlling the difference between forces (A and X).

19. A relay device comprising a lever, a fulcrum for said lever, a movable support for said fulcrum adapted to be shifted lengthwise of the lever, springs connected to said lever on each side of the fulcrum and acting in opposition to each other, a pressure responsive device associated with each spring and connected to the lever so as to oppose the forces exerted by the springs on the lever, one of said pressure responsive devices being arranged for connection to a source of primary pressure impulses and to cause said lever to tilt in one direction or the other, and a valve connected to the other of said pressure responsive devices and operated by said lever for controlling the delivery of secondary pressure impulses thereto and to a sending line, said valve operating either to increase or decrease said secondary impulses in accordance with the direction of tilt of said lever to maintain said lever in balanced position.

20. A relay device comprising a lever having a fulcrum, means connected to said lever to yieldingly oppose turning of the lever in either direction about its fulcrum, pressure responsive devices connected to said lever, one being disposed to turn the lever in one direction and the other being disposed to turn the lever in the other direction, one of said pressure responsive devices being arranged for connection to a source of primary pressure impulses and to cause said lever to tilt in one direction or the other, and a valve connected to the other of said pressure responsive devices and operated by said lever for controlling the delivery of secondary pressure impulses thereto and to a sending line, said valve operating to maintain the secondary impulses at such a value that the forces exerted on the lever by said pressure responsive devices and said yielding means are maintained in balance.

21. A relay device comprising a lever, a fulcrum for said lever, a movable support for the fulcrum adapted to be shifted lengthwise of the lever, means connected to said lever to yieldingly oppose turning of the lever in either direction about its fulcrum, pressure responsive devices connected to said lever, one being disposed to turn the lever in one direction and the other being disposed to turn the lever in the other direction, one of said pressure responsive devices being arranged for connection to a source of primary pressure impulses and to cause said lever to tilt in one direction or the other, and a valve connected to the other of said pressure responsive devices and operated by said lever for controlling the delivery of secondary pressure impulses thereto and to a sending line, said valve operating to maintain the secondary impulses at such a value that the forces exerted on the lever by said pressure responsive devices and said yielding means are maintained in balance.

22. A relay device comprising a lever, a fulcrum for said lever, means connected to said lever on each side of the fulcrum for yieldingly opposing the turning of the lever on its fulcrum, pressure responsive devices connected to said lever one at each side of the fulcrum and at the same distance therefrom that the yielding means are connected to the lever and acting on said lever in opposition to said yielding means, one of said pressure responsive devices being arranged for connection to a source of primary pressure impulses and to cause said lever to tilt in one direction or the other, and a valve connected to the other of said pressure responsive devices and operated by said lever for controlling the delivery of secondary pressure impulses thereto and to a sending line, said valve operating to maintain the secondary impulses at such a value that the forces exerted on the lever by said pressure responsive devices and said yielding means are maintained in balance.

23. A relay device comprising a lever, a fulcrum for said lever, means connected to said lever on each side of the fulcrum for yieldingly opposing the turning of the lever on its fulcrum, pressure responsive devices connected to said lever one at each side of the fulcrum and at the same distance therefrom that the yielding means are connected to the lever and acting on said lever in opposition to said yielding means, one of said pressure responsive devices being arranged for connection to a source of primary pressure impulses and to cause said lever to tilt in one direction or the other, a valve connected to the other of said pressure responsive devices and operated by said lever for controlling the delivery of secondary pressure impulses thereto and to a sending line, said valve operating to maintain the secondary impulses at such a value that the forces exerted on the lever by said pressure responsive devices and said yielding means are maintained in balance, and means for individually adjusting said yielding means.

24. A relay device comprising a lever, a fulcrum for said lever, means connected to said lever on each side of the fulcrum for yieldingly opposing the turning of the lever on its fulcrum, a pressure responsive device connected to said lever at each side of the fulcrum and at the same distance therefrom that the yielding means are connected to the lever and acting on said lever in opposition to said yielding means, one of said pressure responsive devices being arranged for connection to a source of primary pressure impulses and to cause said lever to tilt in one direction or the other, a valve connected to the other of said pressure responsive devices and operated by said lever for controlling the delivery of secondary pressure impulses thereto and to a sending line, said valve operating to maintain the secondary impulses at such a value that the forces exerted on the lever by said pressure responsive devices and said yielding means are maintained in balance, means for individualy adjusting said yielding means, and means for shifting the fulcrum lengthwise of said lever between the points of connection of said yielding means and pressure responsive devices to the lever.

GEORGE W. SMITH.

---

CERTIFICATE OF CORRECTION.

Patent No. 2,016,824.                            October 8, 1935.

GEORGE W. SMITH.

It is hereby certified that error appears in the printed specification of the above numbered patent requiring correction as follows: Page 8, second column, line 23, after "initial" insert compression; line 32, for "9" read 10; line 34, for "10" read 9; and that the said Letters Patent should be read with this correction therein that the same may conform to the record of the case in the Patent Office.

Signed and sealed this 14th day of Janunuary, A. D. 1936.

Leslie Frazer (Seal)                                        Acting Commissioner of Patents.

connected to the other of said pressure responsive devices and operated by said lever for controlling the delivery of secondary pressure impulses thereto and to a sending line, said valve operating to maintain the secondary impulses at such a value that the forces exerted on the lever by said pressure responsive devices and said yielding means are maintained in balance.

21. A relay device comprising a lever, a fulcrum for said lever, a movable support for the fulcrum adapted to be shifted lengthwise of the lever, means connected to said lever to yieldingly oppose turning of the lever in either direction about its fulcrum, pressure responsive devices connected to said lever, one being disposed to turn the lever in one direction and the other being disposed to turn the lever in the other direction, one of said pressure responsive devices being arranged for connection to a source of primary pressure impulses and to cause said lever to tilt in one direction or the other, and a valve connected to the other of said pressure responsive devices and operated by said lever for controlling the delivery of secondary pressure impulses thereto and to a sending line, said valve operating to maintain the secondary impulses at such a value that the forces exerted on the lever by said pressure responsive devices and said yielding means are maintained in balance.

22. A relay device comprising a lever, a fulcrum for said lever, means connected to said lever on each side of the fulcrum for yieldingly opposing the turning of the lever on its fulcrum, pressure responsive devices connected to said lever one at each side of the fulcrum and at the same distance therefrom that the yielding means are connected to the lever and acting on said lever in opposition to said yielding means, one of said pressure responsive devices being arranged for connection to a source of primary pressure impulses and to cause said lever to tilt in one direction or the other, and a valve connected to the other of said pressure responsive devices and operated by said lever for controlling the delivery of secondary pressure impulses thereto and to a sending line, said valve operating to maintain the secondary impulses at such a value that the forces exerted on the lever by said pressure responsive devices and said yielding means are maintained in balance.

23. A relay device comprising a lever, a fulcrum for said lever, means connected to said lever on each side of the fulcrum for yieldingly opposing the turning of the lever on its fulcrum, pressure responsive devices connected to said lever one at each side of the fulcrum and at the same distance therefrom that the yielding means are connected to the lever and acting on said lever in opposition to said yielding means, one of said pressure responsive devices being arranged for connection to a source of primary pressure impulses and to cause said lever to tilt in one direction or the other, a valve connected to the other of said pressure responsive devices and operated by said lever for controlling the delivery of secondary pressure impulses thereto and to a sending line, said valve operating to maintain the secondary impulses at such a value that the forces exerted on the lever by said pressure responsive devices and said yielding means are maintained in balance, and means for individually adjusting said yielding means.

24. A relay device comprising a lever, a fulcrum for said lever, means connected to said lever on each side of the fulcrum for yieldingly opposing the turning of the lever on its fulcrum, a pressure responsive device connected to said lever at each side of the fulcrum and at the same distance therefrom that the yielding means are connected to the lever and acting on said lever in opposition to said yielding means, one of said pressure responsive devices being arranged for connection to a source of primary pressure impulses and to cause said lever to tilt in one direction or the other, a valve connected to the other of said pressure responsive devices and operated by said lever for controlling the delivery of secondary pressure impulses thereto and to a sending line, said valve operating to maintain the secondary impulses at such a value that the forces exerted on the lever by said pressure responsive devices and said yielding means are maintained in balance, means for individualy adjusting said yielding means, and means for shifting the fulcrum lengthwise of said lever between the points of connection of said yielding means and pressure responsive devices to the lever.

GEORGE W. SMITH.

---

CERTIFICATE OF CORRECTION.

Patent No. 2,016,824.   October 8, 1935.

GEORGE W. SMITH.

It is hereby certified that error appears in the printed specification of the above numbered patent requiring correction as follows: Page 8, second column, line 23, after "initial" insert compression; line 32, for "9" read 10; line 34, for "10" read 9; and that the said Letters Patent should be read with this correction therein that the same may conform to the record of the case in the Patent Office.

Signed and sealed this 14th day of Januuary, A. D. 1936.

Leslie Frazer (Seal)   Acting Commissioner of Patents.